Nov. 10, 1931.     W. F. ROSS     1,831,263
INTERNAL COMBUSTION ENGINE
Filed May 13, 1926    10 Sheets-Sheet 1

Inventor:
Walter F. Ross
By [signature]
Attorneys.

Nov. 10, 1931.  W. F. ROSS  1,831,263
INTERNAL COMBUSTION ENGINE
Filed May 13, 1926   10 Sheets-Sheet 2

Inventor:
Walter F. Ross
By
Attorneys.

Nov. 10, 1931.  W. F. ROSS  1,831,263
INTERNAL COMBUSTION ENGINE
Filed May 13, 1926   10 Sheets-Sheet 3
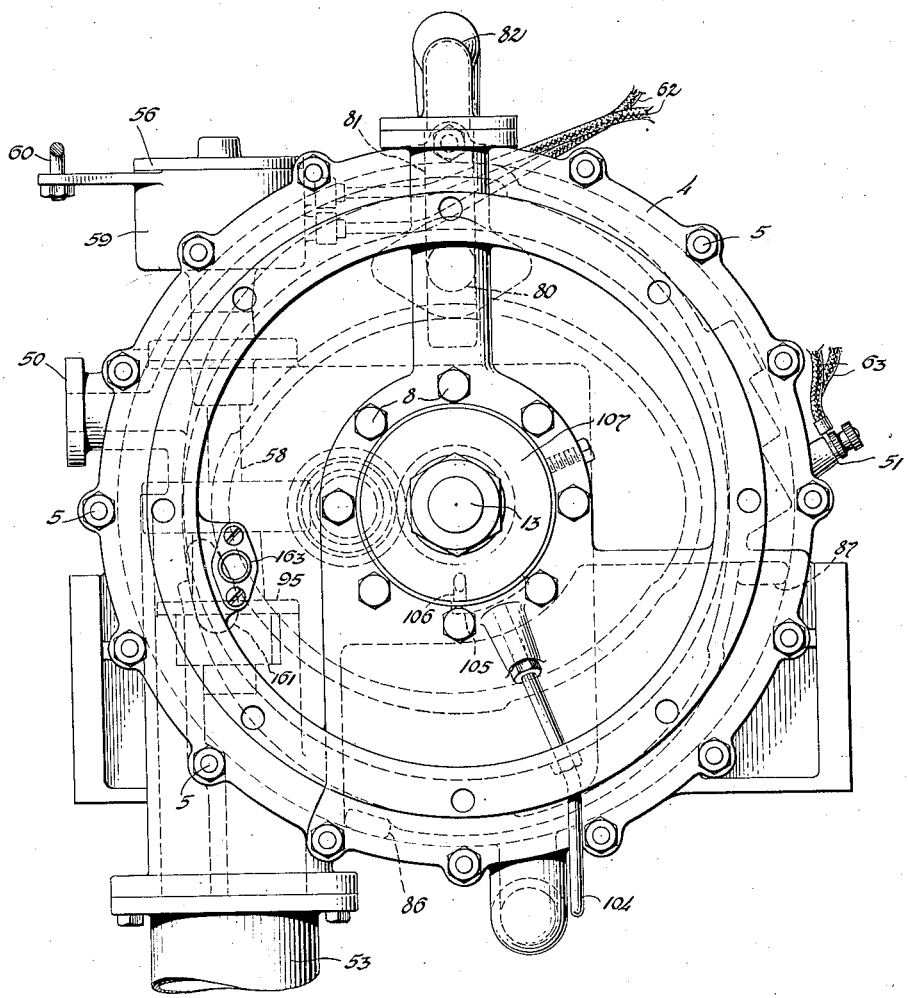

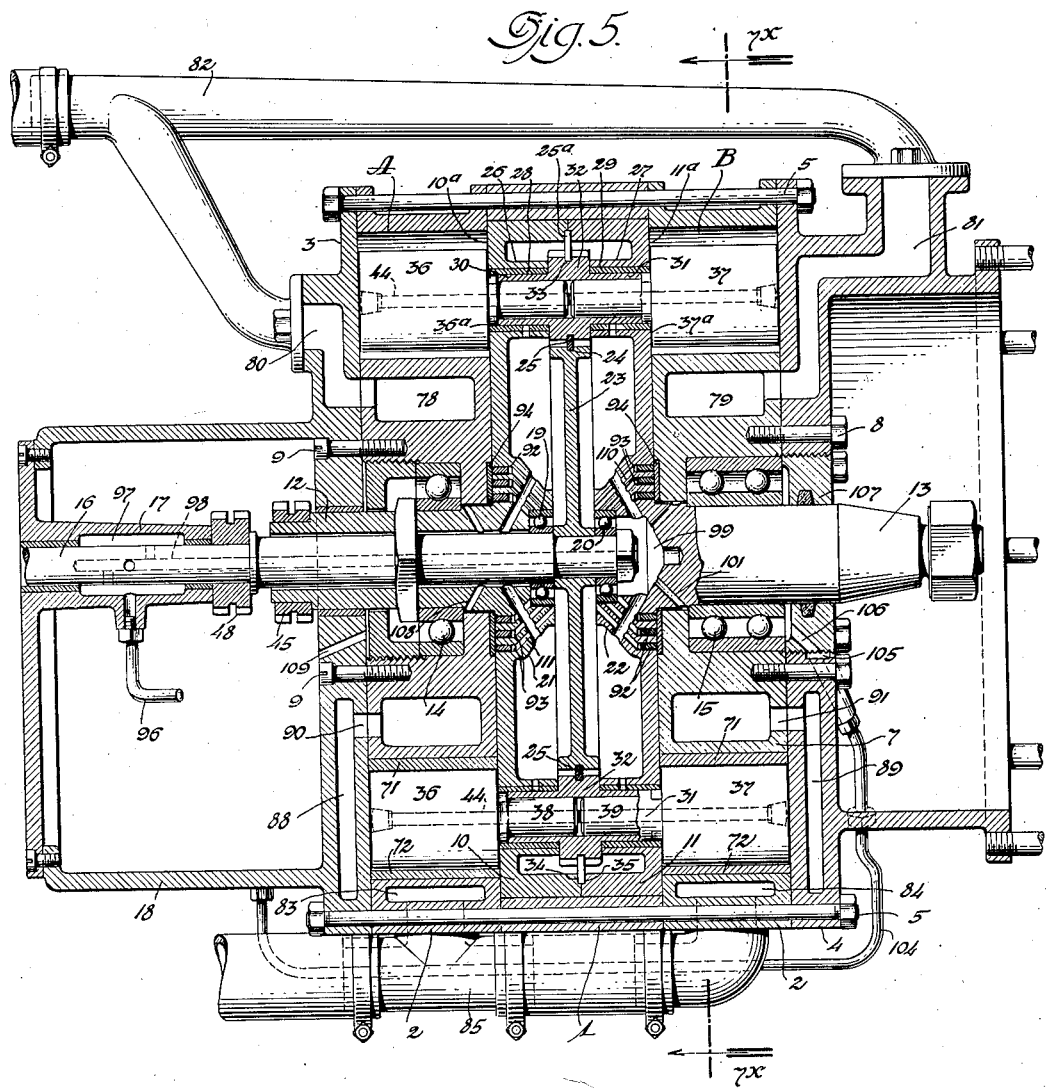
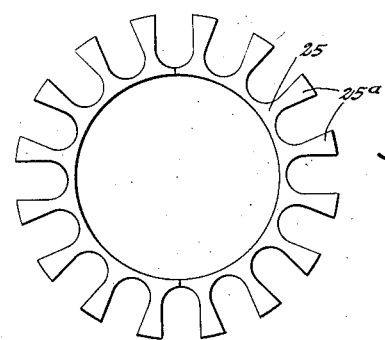

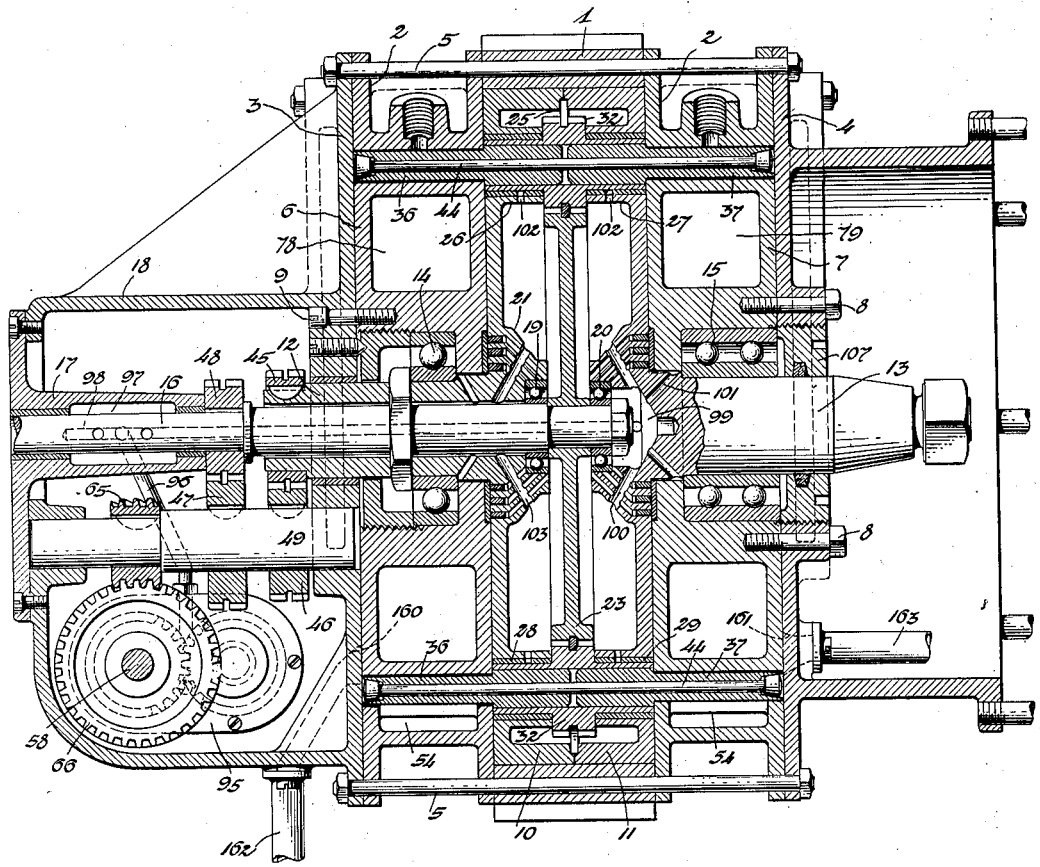

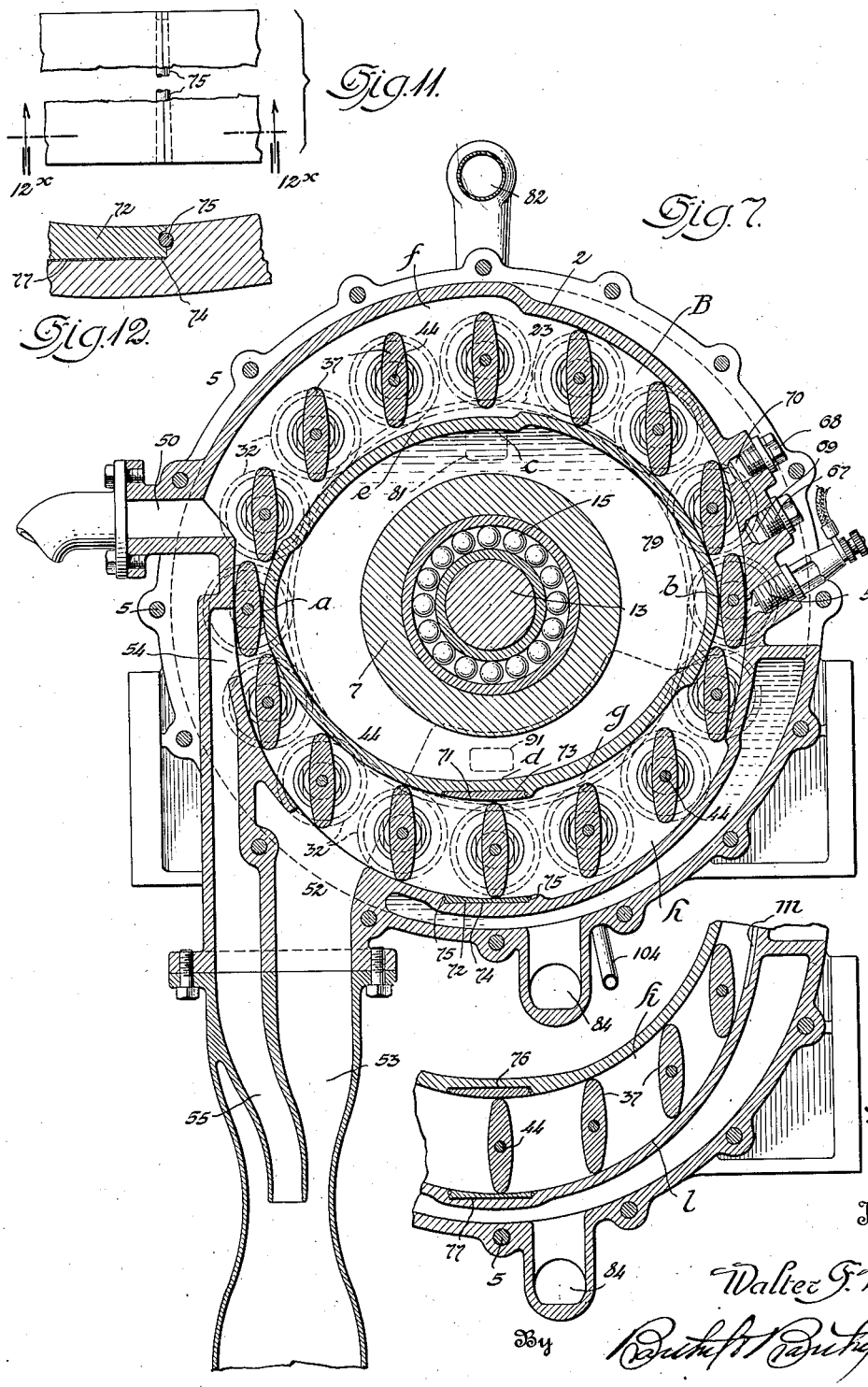

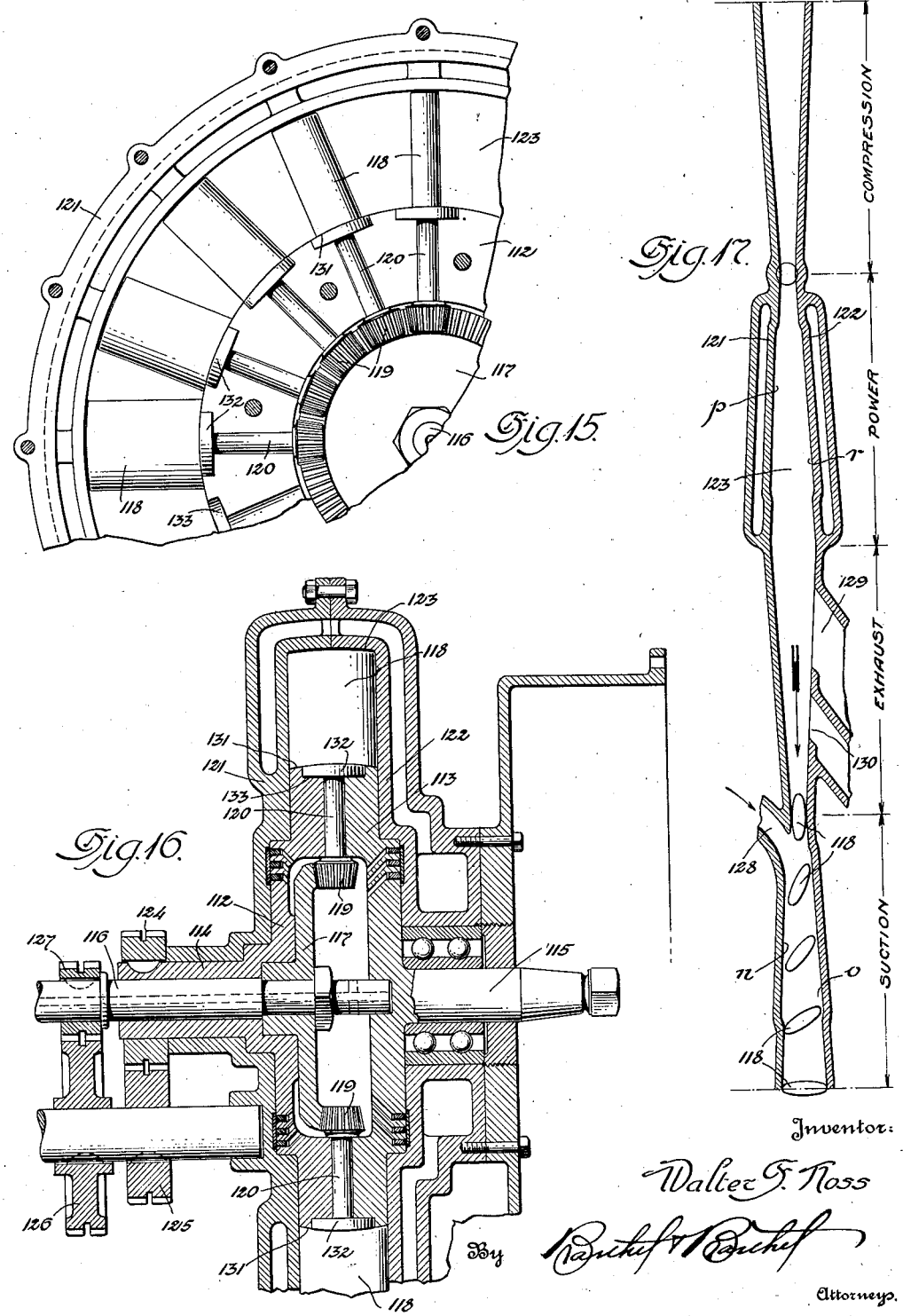

Nov. 10, 1931.  W. F. ROSS  1,831,263
INTERNAL COMBUSTION ENGINE
Filed May 13, 1926    10 Sheets-Sheet 9
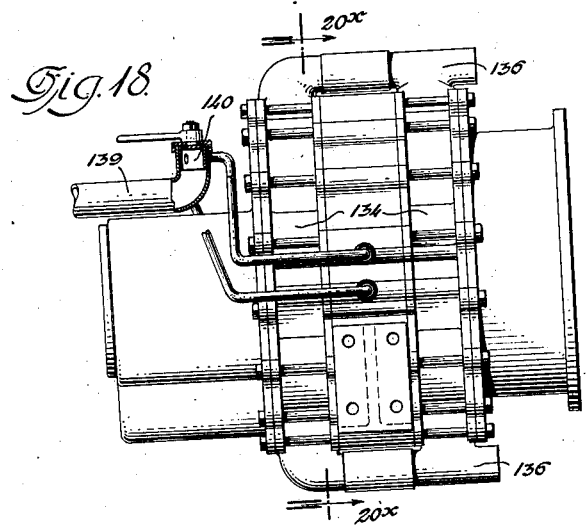
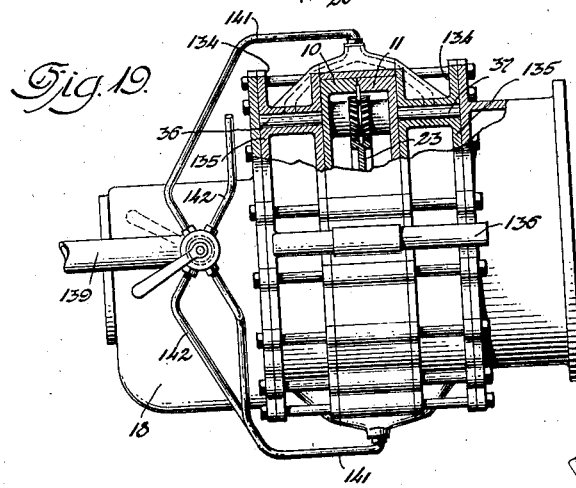
Inventor:
Walter F. Ross
By
Attorneys.

Patented Nov. 10, 1931

1,831,263

UNITED STATES PATENT OFFICE

WALTER F. ROSS, OF DETROIT, MICHIGAN

INTERNAL COMBUSTION ENGINE

Application filed May 13, 1926. Serial No. 108,815.

This invention relates primarily to internal combustion engines although it also lends itself to operation by constant pressure fluids such as steam or preexploded gases and is therefore not limited to internal combustion engines and may in fact by suitable modification of design be readily adapted to either form of operation which may be deemed desirable according to the circumstances under which the engine is to be used.

The engine is however essentially of a rotating piston type as distinguished from reciprocating engines, so that it avoids many of the disadvantages which are peculiar to all reciprocating engines, such for instance as the application of power at inefficient angles to the radius of the main or crank shaft, excessive number of moving parts excessive inertia to be overcome in reversing the movement of parts and gases in the operation of a reciprocating engine, excessive impact loads and low thermal efficiency due to the necessity of maintaining lubrication of the pistons in reciprocating engines.

By my present invention, I not only overcome these disadvantages to a marked degree by eliminating reciprocating motion in the engine, rendering unnecessary the lubrication of parts subject to high temperatures, effecting a continual, tangential application of force to the main shaft, and reducing the number of moving parts as compared with reciprocating engines, but provide an engine wherein may be obtained a great degree of flexibility with a practically continuous flow of power and, as a result, greater proportional power at low speeds than is obtainable in reciprocating engines.

The invention further contemplates, securing a substantial reduction of mechanical friction, especially of the pistons in the cylinders, whereby the lubricating of the said pistons in the manner common in reciprocating engines may be dispensed with, so that the burning of lubricating oil in the cylinders is avoided and economy and also higher efficiency in the utilizing of explosive mixtures in the engine is attained; and also aims to provide for very effective scavenging of the cylinders of the engine in a manner which further results in increased efficiency.

Still further objects of the said invention are to secure by eliminating mechanical contact between the pistons and the cylinders of the engine, reduction of friction such as would otherwise be present in such parts to a minimum and a minimizing of parts requiring extremely fine fitting or adjustment.

A general object of the invention is to obtain a compact engine wherein the weight is quite light for horse power compared with that at present secured in general engine practice and also to provide an engine which admits of much cheaper construction per horse power than is secured in reciprocating engines as commonly constructed.

Still further objects subsidiary to or resulting from the aforesaid objects or from the construction or operation of the invention as it may be carried into effect will become apparent as the said invention is hereinafter further disclosed.

In carrying the invention into effect I may provide an engine casing of a general cylindrical form in which is coaxially mounted a main shaft connected to a rotor which carries a plurality of pistons extending therefrom into cylinders within the said casing, the said pistons being in the form of blades such as of elliptical cross section and the walls of the cylinders variably spaced throughout the bores thereof so that such variation is that of the variation between the major and minor axes of the cross sections of said pistons, the said cylinders being continuous and circumscribing the axis of the engine, and being restricted to the minor axes of the pistons at diametrically opposite points whilst being enlarged to the major axes of the said pistons also at diametrically opposite points intermediate, however, of the restricted points, whereby the cylinder conforms generally to the envelope of the path of said pistons. Means are provided controlling the rotation of the pistons in such manner that they will present their minor axes to the restricted portions of the cylinders as they travel therearound and their major axes to the widest portions of the said cylinders, assuming intermediate angular disposition to the walls of the cylinders in intermediate positions between the narrower and wider parts thereof so that they will accommodate themselves to the progressively narrowing or progressively widening nature of the cylinders as said pistons travel therein, and as a result the volumetric space between adjacent pistons increases as they move toward the wider portions of the cylinders, and decreases as they move beyond such wider portions towards the restricted portions of the said cylinders.

Where the device is intended for operation as an internal combustion engine an inlet is provided to the cylinder just beyond one of the restricted portions thereof and at the opposite restricted portion suitable firing means, such as a spark plug, is provided, so that gases induced into the cylinder by the travel of the pistons to the wider portion thereof in advance of the said inlet and compressed between the pistons as they approach the second restricted portion of the cylinder may be exploded by such firing means, and the expansive effort of such exploded gases utilized in promoting the advance of the pistons as they move towards the second enlarged portion of the cylinder and incidently in promoting the rotation of the rotor and its shaft. A double exhaust pipe is provided beyond the second enlarged portion of the cylinder, and includes a Venturi section which assists in efficient scavenging of the cylinders.

These general features and other more specific features are more specifically described and ascertained hereinafter, by way of example, having reference to the accompanying drawings, wherein—

Figure 3 is a rear elevation of the engine;

Figure 5 is a vertical transverse section of the same;

Figure 6 is a horizontal transverse section;

Figure 7 is a cross sectional view taken on the line 7x—7x, Figure 5;

Figure 8 is an elevation partly broken away and in section of one of the pistons;

Figure 9 is a section on the line 9x—9x, Figure 8;

Figure 10 is an elevation of an oil distributing ring used in association with the piston pinions;

Figure 11 is a fragmentary view of part of one of the cylinder walls, illustrating the manner of securing an adjustable section therein;

Figure 12 is a section on the line 12x—12x, Figure 11;

Figure 14 is a fragmentary sectional view illustrating a modification in the shape of the cylinder as shown in Figure 7;

Figure 15 is a fragmentary elevation of an engine embodying a modification of the invention;

Figure 16 is a fragmentary transverse section of such modified form of engine;

Figure 17 illustrates in section a development of the cylinder of the engine illustrated in Figures 15 and 16;

Figure 18 illustrates in plan a further modified form of engine adapted to reversing operation, the reversing valve being illustrated in section;

Figure 19 is a plan of the same partly in section;

Figure 20 is a section taken on the line 20x—20x, Figure 18;

Figure 21 is a sectional detail view of the reversing valve;

Similar characters of reference indicate similar parts in the several figures of the drawings.

Figure 1:
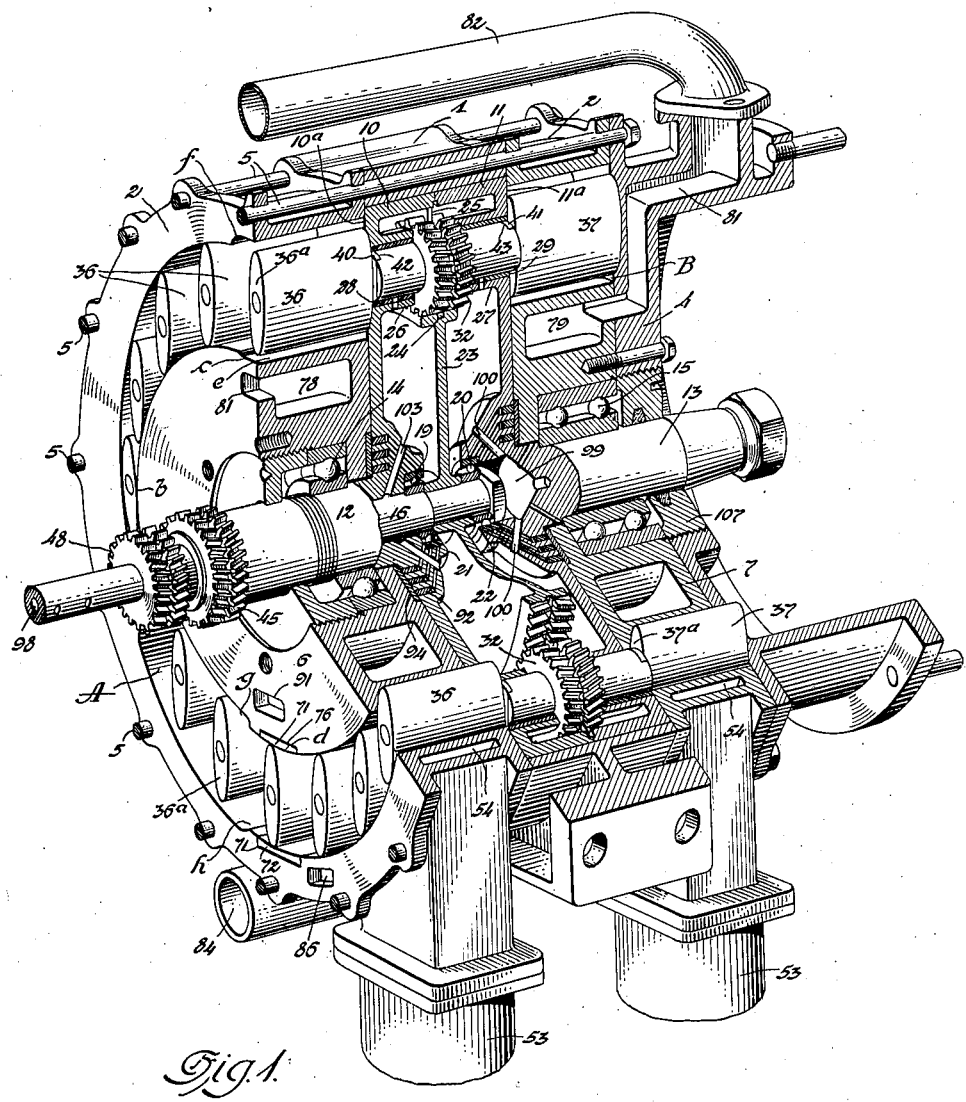
Figure 1 is a perspective view of an internal combustion engine embodying the said invention.
Figure 2:
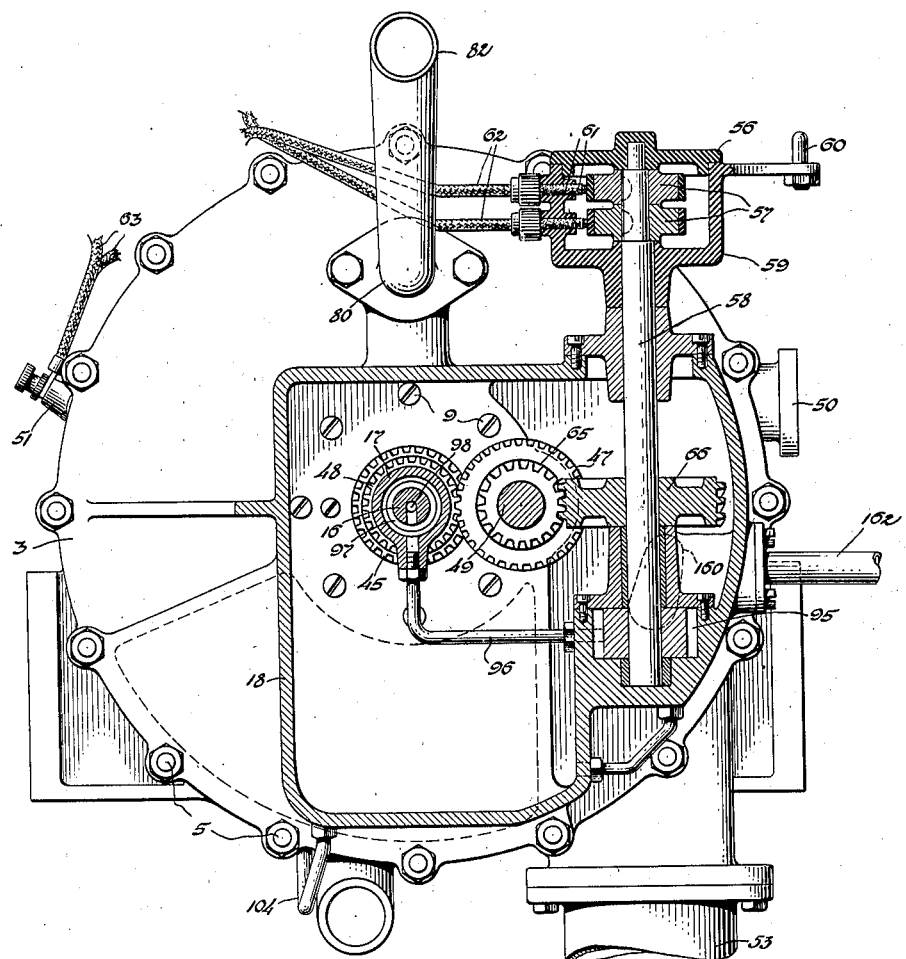
Figure 2 is an elevation of the same partly in section.
Figure 13:
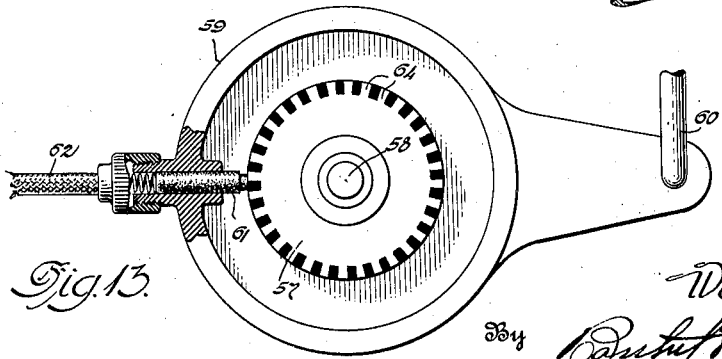
Figure 13 is a plan view of the distributor shown in cross section in Figure 2.
Figure 4:
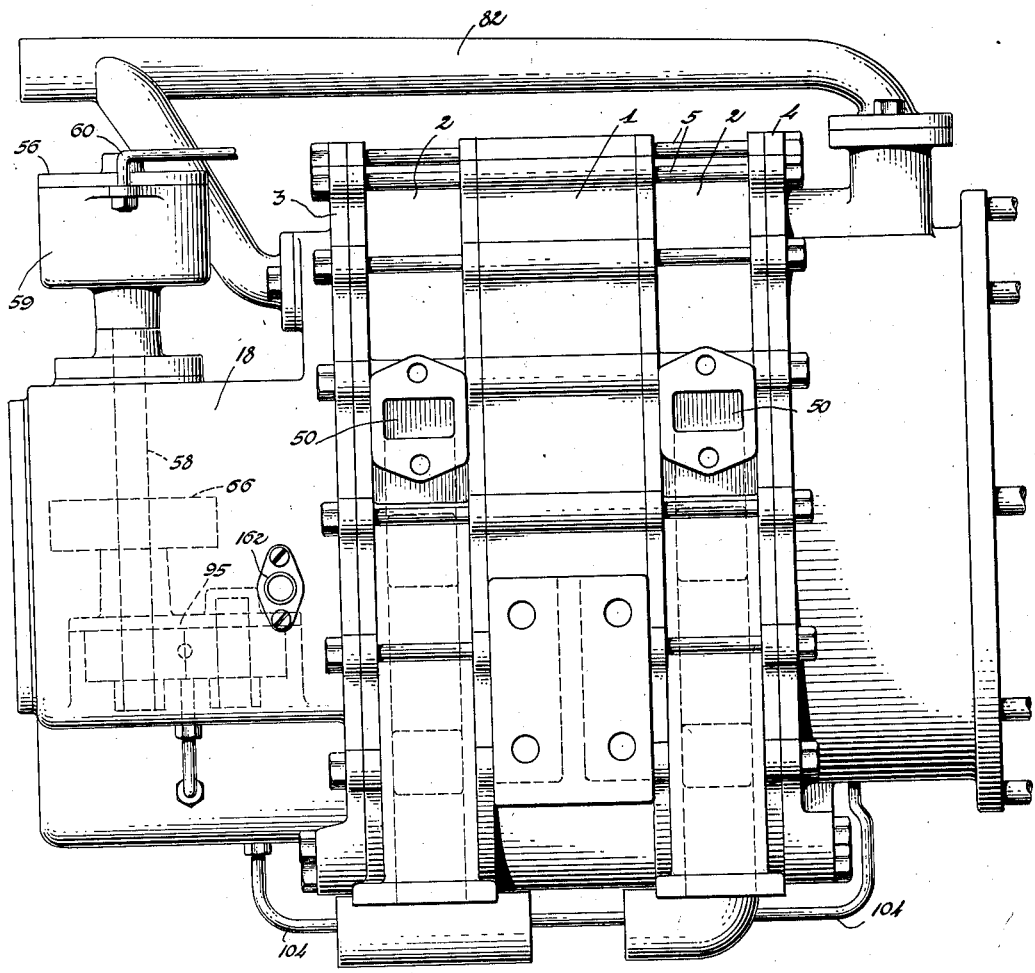
Figure 4 is a side elevation of the same.

Referring first to Figures 1 to 13, the illustrations show an engine having a casing of generally cylindrical form and comprising a central rotor housing 1, to the opposite sides of which are bolted cylinder casings 2 provided with end plates or heads 3 and 4, the said members 1, 2, 3 and 4 being secured in assembled relation by bolts 5, and also carried by the end plates are interior cylinder castings or drums 6 and 7 which are indicated as being held in position on the said end plates as by machine screws 8 and 9. The drums 6 and 7 it will be seen have an external configuration roughly of elliptical form with the major axis horizontal and the cylinder casings 2 have an internal configuration also roughly of elliptical form with the major axis vertical or perpendicular to the major axes of the drums, so that the walls of the drums approach the walls of the cylinder casings at points $a$ and $b$ on the major axes of the said drums and recede from the walls of the cylinder casing at the upper and lower points $c$ and $d$ on the minor axes of the said drums.

Located in the central housing 1 is a two-part rotor comprising members 10 and 11 provided with shafts 12 and 13 journaled in bearings 14 and 15 respectively, which bearings are located in the said drums 6 and 7, the shaft 12 being tubular and housing an inner shaft 16 the outer end of which is journaled in a bearing member 17 in a casing 18 extending from the cylinder head 3.

The inner end of the said shaft 16 is journaled in bearings 19 and 20 in opposed bosses 21 and 22 of the rotor members 10 and 11 respectively. These bosses are spaced apart, and on that portion of the shaft 16 extending therebetween is mounted a herring-bone gear 23 having a medial annular groove 24 therein which accommodates the inner periphery of a two-part retaining ring 25.

The rotor members 10 and 11 are also provided with a number of internal bosses 26 and 27 arranged in circular series and provided with bearings 28 and 29 in which are journaled tubular spindles 30 and 31 extending from opposite sides of herring-bone pinions 32, which pinions are situated between opposed bosses 26 and 27 and mesh with the gear 23. These pinions have medial annular recesses 33 for the reception of the radially projecting arms 25a of the ring 25. The inner periphery of the said ring is rotatable in the groove 24 of the gear 23 and the extremities of the arms 25a of the said ring enter and are preferably clamped between the rims of the rotor members 10 and 11 which are recessed at 34 and 35 for their reception.

36 and 37 are pistons arranged in circular series in the two cylinders hereinafter referred to as A and B, the said pistons being in this instance sixteen in number in each cylinder and the centers of the pistons equidistantly spaced around the cylinders, the said pistons 36 and 37 having stems 38 and 39 which extend into the hollow spindles 30 and 31 of the pinions 33 and are held against rotation, within and relative to the said spindles, by shoulders 40 and 41 which enter recesses 42 and 43 in the ends of the said spindles.

The pistons 36 and 37 and their pinions are secured together in assembled relation by bolts 44 extending axially therethrough, and it is preferred that the length of the sleeves 30 and 31 of the pinions be such that when the pistons are bolted in place, their inner opposed faces 36a and 37a will be maintained in a spaced relation slightly greater than the distance between the outer faces 10a and 11a of the rotor members 10 and 11 whereby a slight clearance will be maintained between the said faces 36a and 37a of the pistons and 10a and 11a of the rotor.

It will be seen that the pistons are of approximately elliptical configuration in cross section, the major axes of their ellipses being very slightly less than the wider parts of the cylinders at c and d (disregarding for the moment specially provided clearances which will be hereinafter referred to) whilst the minor axes of the ellipses are very slightly less than the spacing of the cylinder walls at the restricted points a and b; and it will be further noticed that the said pistons are arranged in such manner that, in this case, their major axes are always vertical irrespective of their different locations in the cylinders so that they accommodate themselves to the progressively narrowing or progressively widening nature of the said cylinders due to the relative varying of the angle of the major axes of the different pistons to the tangents of their points of virtual contact with the inner or outer walls of the cylinders.

To secure this result it is necessary to time the pinions so that they will perform one counter revolution to each revolution of the rotor, and this is effected by gearing the shaft 12 of the rotor member 10 to the shaft 16 of the gear 23 by means of a reducing train of gears 45, 46, 47 and 48, the gears 46 and 47 of which are mounted on a counter shaft 49 journaled in the walls of the cylinder head 3 and its casing 18, the operation of which gearing in controlling the rotation of the pinions relative to the rotor being obvious and therefore not calling for more detailed explanation.

Figure 7 very clearly indicates the relative dispositions of the pistons to one another and to the walls of the cylinder in which they move, it being understood that the major axes of these pistons remain parallel in the manner shown as they travel around the cylinder, this condition being of course true of the pistons in both of the cylinders A and B.

Each cylinder is provided with an inlet port 50 entering the same at a point at or adjacent to the restricted part a thereof, and, in the example at present being described, the cylinder walls are indicated as being recessed at e and f from the region of the said inlets to the region of the wider upper part of the cylinders at c in order to provide a substantial clearance of the pistons from the inner and outer cylinder walls during the first quadrant of their orbit of movement which for convenience will be hereinafter referred to as the "suction stroke". From this point, however, the walls of the cylinders again assume their true form hereinbefore described, so that they practically contact with the pistons during the second quadrant of their movement, which is hereinafter referred to as the "compression stroke" and which extends to the second restricted point b of the cylinders. At or adjacent to this point is situated a spark plug 51 and the cylinder again commences to widen, and has its inner and outer walls again recessed in this case to provide clearances g and h somewhat similar to the clearances e and f previously referred to, such clearances g and h extending almost to the second wider portion of the cylinders at d whereupon the true form of the cylinder practically contacting with the pistons is again resumed. This last quadrant of the movement of the pistons through that portion of the cylinders having the clearances g and $h$ will be referred to as the "firing stroke" and the final quadrant of movement from the point $d$ to the point $a$ will be referred to as the "exhaust stroke". Similarly the portions of the cylinders through which the pistons move in performing their inlet and other strokes will be referred to as the "inlet portion", "compression portion", and so forth.

The exhaust portions of the cylinders are each provided with two exhaust ports, the first port 52 being somewhat beyond the final end of the firing portions of the cylinders and open into a Venturi tube 53, whilst the second exhaust port 54 opens into a nozzle 55 entering the said Venturi tube 53, so that the passage of exhaust gases from the port 52 through the Venturi tube will induce a further flow through the nozzle 55 from the exhaust port 54, and preferably from the outside air to obtain a thorough scavenging of the exhaust portion of the cylinder as will be further explained.

I have shown as being applicable, although not necessarily essential as will later become apparent, a distributor 56. This includes commutators 57 mounted upon a distributor shaft 58 and enclosed in a rotatably adjustable housing 59 which may be of insulating material provided with a lever 60 for its adjustment and carrying the brushes 61 communicating with wires 62 leading through source of electrical energy such as a battery and the primary circuit of a vibrator coil to a suitable switch and return to ground on the motor, the secondary of the said coil being connected to the spark plugs 51 as by wires 63. The operation of such distributors is well known and does not require further description herein except to point out that in the illustrated device there are twice as many contact points 64 on the commutators 57 as there are pistons of the engine in each cylinder, and the said commutators 57 are therefore rotated through gearing 65 and 66 at one half engine speed. The distributor 56 is shown with two commutators 57 in order that the two spark plugs, one in each cylinder of the engine, may be in separate circuits. The battery coil and switch above mentioned are not illustrated as they do not form a feature of the invention and their nature and use in internal combustion engines is well known. Further, any suitable ignition means may be substituted therefor.

It will thus be seen that the distributor will provide for the firing of charges behind every piston of the engine as each one passes the spark plug 51 of the cylinder in which it is located, and that, assuming the rotor speed to be one thousand R. P. M., there would thus be sixteen thousand explosions per minute in each cylinder, which means a practically continuous application of power to the rotor at an almost constant pressure. Even at low speeds the large number of explosions to each revolution of the rotor will still result in a practically continuous torque so that at such low speeds a highly proportional power efficiency will be maintained.

As has already been indicated, it is not necessary that the inner and outer walls of the cylinders closely approach the pistons throughout their entire orbits of movement of the said pistons, and in the internal combustion type of engine substantial clearances $e$ and $f$ throughout the inlet stroke, and $g$ and $h$ throughout or practically throughout the firing stroke is preferred, as for one reason this substantially reduces the accuracy of contour required in the cylinders, and permits the equalizing of pressure resulting in less strain on mechanism.

As each piston enters the compression portion of its cylinder it traps a charge of explosive mixture therein between the said piston and the piston in advance thereof, and as it further travels through the cylinder, induces inlet gases into the inlet portion of the cylinder at the same time compressing the trapped charge due to the fact that the space in advance of the said piston is progressively reduced as it approaches the restricted portion $b$ of the cylinder, whereupon, at or about such point, the charge is ignited by the spark plug 51.

The said spark plug does not necessarily need to be in the precise position shown, and I have indicated plugs 67 and 68, closing seats 69 and 70 at other positions in the cylinder, whereby upon removal of either of the said plugs a spark plug may be located in one or other of the said seats if it be desired to make such variation of the point where the firing is to take place. This means of varying the point of detonation is simply shown by way of illustration as the many ways in which ignition may be advanced or retarded in an engine are common knowledge to those skilled in the art to which this invention appertains, and it is simply desired to indicate that the firing point is not necessarily precisely at the restricted portion $b$ of the cylinder.

As each piston is subjected to the force of the explosion behind it, it is impelled in its orbit through the firing portion of the cylinder, and where the clearances $g$ and $h$ are provided the whole of the firing portion, or practically so, becomes a single cylinder the final piston in which receives the force of the explosive charge as it enters the portion $d$ of the cylinder, this being repeated with each piston as it so enters such portion of the cylinder and the exploding charge in the firing portion of the cylinder being added to as each piston enters such firing portion.

In this way it is possible, by correct design of the clearances $g$ and $h$ about the pistons in the firing portion of the cylinder, to maintain a continuous combustion in such firing portion which will progressively ignite the charge behind each piston as it enters the said firing portion without requiring the assistance of the spark plug or other ignition means; and in this case the spark may be utilized simply to promote the initial firing when starting the engine and not used during the running of the engine as will be readily seen. In such case the distributor may be dispensed with and a high frequency current passed through the plug to maintain sparking activity at the points thereof during the starting operation without any special means of timing such sparking activity.

Ordinarily the closest approch of the cylinder walls to the pistons may be around, say, one thousandth of an inch without any contact of the pistons with the cylinder walls taking place even in the suction and exhaust portions of the cylinders as it is found that such slight clearance in an engine of this type does not seriously affect its operation, and has on the other hand especial advantages in that friction between the pistons and the cylinder walls is avoided with a consequent saving of wear and power, and also that lubrication of the pistons and cylinder walls is rendered unnecessary so that a higher degree of thermal efficiency may be secured without the carbonization and other objectionable features attendant upon the use of oil in the cylinders of internal combustion engines.

This slight clearance does not permit the firing back of an ignited charge and the pre-ignition of the charge in the compression portion of the cylinder as may possibly be presumed, it being required that the clearance be fairly substantial before this would occur, and it is this characteristic of firing back where the clearance is substantial that is adopted in the firing portion of the cylinders where the clearances $g$ and $h$ are provided.

This arrangement of clearances $g$ and $h$ provides for an equalizing of pressure throughout the firing portion of the cylinder which, as stated, is applied to each piston as it becomes in its movement the final piston of the said firing portion of the cylinder, but as shown in Figure 14 this substantial clearances $g$ and $h$ may be omitted and the true form of the cylinder maintained in the firing portion as at $k$ and $l$ with a minimum of clearance wherein the progressive expansive effect of the explosive gases is applied to each piston during its travel through the firing portion of the cylinder. In this case, however, if thought necessary or desirable, a clearance $m$ may be provided in one or other of the walls of the cylinder at the beginning of the firing portion thereof to permit the back-firing past each piston as it enters the said firing portion to progressively ignite the charge behind each piston as it enters the firing portion without requiring the assistance of a spark plug or other ignition means for that purpose.

At the point $d$ which is the final end of the firing portions of the cylinders I prefer to ensure a close approach of the cylinder walls to the pistons as it is at this point that the explosive forces are concentrated, and deleterious leakage might possibly occur, for which reason I have indicated the use of replaceable or adjustable liners 71 and 72 in opposite walls of the cylinder and secured in recesses 73 and 74 therein by tapered pins 75 which may be driven between the end walls of the recesses and the opposed edges of the liners, both of which are correspondingly grooved for the reception of such pins. To adjust the liners the pins may be withdrawn and shims 76 and 77 inserted beneath the liners, after which the tapered pins may be replaced as far as they will then enter their respective grooves, and any resulting projecting portions of the pins cut off.

The pinions within the rotor retain the pinions 32 equidistantly between the cylinders and thereby prevents endwise movement of the pistons in the said cylinders in order that the ends of the said pistons may have the requisite clearance from the cylinder heads and the rotors to avoid friction between such parts as would otherwise result, so that it will be apparent that there is practically no contact of the pistons with any of the walls of the cylinders at any time except such possible contact as may be provided for by the liners 76 and 77, Figure 14, although even these may be adjusted to provide a minimum friction at the final ends of the firing portions of the cylinders and may in fact very slightly clear the pistons. The pistons are in no way supported by the walls of the cylinders, being entirely supported in the bearings 28 and 29 of the rotor members 10 and 11.

As the pistons, following their firing strokes, travel through the exhaust portions of the cylinders they first pass beyond the exhaust port 52 and the products of combustion are discharged therethrough into the Venturi tube 53, thereby setting up a suction in the nozzle 55 which results in a final extraction of exhaust gases from between the pistons as they eventually pass the port 54.

I prefer to provide for the admission of air to the exhaust portions of the cylinders and more especially thereto in proximity to the second exhaust ports 54 for which purpose I indicate the cylinder heads 3 and 4 as being provided with openings 160 and 161 with which communicating air pipes 162 and 163 through which atmospheric or compressed air may be introduced to the exhaust portion of the cylinder opposite the exhaust ports 54, so that before the pistons pass to the inlet portions of the cylinders the exhaust gases will be completely washed out with pure air and carried away through the nozzle 55 as will be readily understood, a high degree of scavenging being in this way secured, the advantages of which are too well known to require further mention herein, and at the same time a very desirable cooling effect on the pistons is obtained by the scavenging air.

The cooling of such an engine may be easily taken care of by making the drums 6 and 7 hollow to provide water chambers 78 and 79 having outlet passages 80 and 81 in the cylinder heads 3 and 4, respectively, leading to a discharge pipe 82 which may be connected to any form of radiator or other cooling device. The cooling water enters water jackets 83 and 84 formed in the outer wall of the firing portion of the cylinder by way of a water inlet pipe 85, the said water jacket communicating by means of passages 86 and 87 with further water jackets 88 and 89 formed in the heads 3 and 4 and extending over the firing portions of the cylinders. These water jackets 88 and 89 in turn communicate through passages 90 and 91 with the water chambers 78 and 79 of the cylinder drums, thereby providing for complete water circulation.

A free fitting of the rotor members 10 and 11 between the drums 6 and 7 is necessary so that the said rotor members may revolve with a minimum of friction, and, to prevent leakage of gases from the cylinders to the bearings or other parts of the engine, I may provide the said rotor members with seal rings 92 located in packing grooves 93 and bearing against plates 94 recessed into the opposed faces of the said drums 6 and 7 to form an effective gas seal about the shafts 12 and 13.

Lubrication for the rotor, its bearings and the bearings of the pinion spindles 30 and 31, as well as the lubrication of the pinions 32, gear 23, and the seal rings 92, is provided for by an oil pump 95 operated by the lower end of the distributor shaft 58 and adapted to pump oil through a pipe 96 into a chamber 97 formed in the bearing member 17 of the casing 18, and from thence the oil is forced through an axial passage 98 in the shaft 16 into a chamber 99 formed in the boss 22 of the rotor member 11 from which chamber extend passages 100 and 101 leading to the interior of the rotor and to the main bearing 15 of the engine respectively.

Thus the interior of the said rotor may be completely filled with oil if so desired, forming an oil bath for the gear 23 and pinions 32, ducts 102 admitting lubricant to the journals of the pinion spindles 30 and 31, and the said bearing 15 being also flooded with oil. Similarly passages 103 in the boss 21 admit oil to the bore of the shaft 12 through which the said shaft 16 extends with substantial clearance between the two shafts so that some of the lubricant will return to the casing 18 through the annular passage between the said two shafts 12 and 16.

The bearings 19 and 20 of the shaft 16 are of course freely lubricated by the bath of oil within the rotor and the casing 18 is preferably maintained full of oil in which all of the gearing within the said casing operates, 104 being a return oil line leading to the said casing 18 from an oil groove 105 in the cylinder head 4 which receives oil from a bearing 15 through a duct 106 in a bearing retaining ring 107 mounted in the said cylinder head 4. Flow through the bearing 14 is permitted by oil ducts 108 and 109 in the shaft 12 and the cylinder head 3 respectively, and ducts 110 and 111 in the bosses 21 and 22 of the rotor members provide for a supply of lubricant to the packing rings 92.

It will be apparent that there are comparatively few surfaces requiring lubrication, and that adequate provision for lubrication of such surfaces is easy of attainment such as in the manner described.

The gear 23 is preferably imperforate so that it forms a partition in the rotor, and the oil distributing ring 25 forms an extension of such partition beyond the pinions, so that it ensures a flow of oil around the gear and distributing ring and incidently over the pinions and back to the central part of the rotor in effecting its escape between the shafts 12 and 16. This insures the thorough lubrication of all the moving parts within the rotor and also effects an oil cooling of such parts and of the said rotor.

The objects of this invention may be attained by constructions varying in many ways from that already described, whilst involving salient features of such construction as will be readily understood, and, as an example of such possible variation, attention is directed to the arrangement disclosed in Figures 15, 16 and 17, wherein 112 and 113 are the rotor members corresponding to the members 10 and 11 of the first described construction, 114 and 115 the shafts of the said rotor members.

The first of these shafts is tubular to accommodate an interior shaft 116 corresponding to the shaft 16 of the said first described construction and which shaft 16 has mounted thereon a bevel gear 117 which is located between the said rotor members and acts, in the manner of the gear 23 hereinbefore referred to, to control the rotation of pistons 118 on their axes, which control is effected through the medium of pinions 119 meshing with the said bevel gear and mounted upon spindles 120 of the said pistons.

The cylinder casing in this example is shown as being in two parts 121 and 123, the outer parts of which extend substantially beyond the periphery of the rotor and form the annular cylinder 123. In this case the pistons are arranged with their axes rotating from the center of revolution of the rotor, and gearing 124, 125, 126 and 127 controls the rotation of the bevel gear 117 in such manner as to cause each of the pistons to rotate once in each revolution of the rotor. The pistons are of similar elliptic cross section to those described in connection with Figures 1 to 14, and therefore, as a result of such rotation their major axes wil be transverse to the cylinder at two opposite points in their orbit of movement through the said cylinder, and their minor axes will be transverse to the said cylinder at two intermediate opposite points, as will be readily understood by referring to the development of the cylinder shown in Figure 17.

The said Figure 17 clearly shows that the side walls of the cylinder alternately approach and diverge from one another to agree with the changing disposition of the major axes of the pistons therein at different points of their orbit of movement, so that the effect of this alternate transverse contraction and expansion of the cylinder section and of the corresponding movement of the pistons therein is similar to that already described in connection with the structure illustrated in Figures 1 to 14 in obtaining suction, compression, power and exhaust strokes, an inlet port 128 corresponding to the port 50 is provided at the beginning of the inlet stroke, and exhaust ports 129 and 130 corresponding to the ports 52 and 54 similarly provided.

$n$ and $o$ are clearances in the wall of the suction portion of the cylinder corresponding to the clearances $e$ or $f$, and $p$ and $r$ are clearances in the wall of the power portion of the cylinder corresponding to the clearances $g$ or $h$, the purposes of which have already been described.

With radially arranged pistons as shown in this example the peripheral surface of the rotor may be given a spherical contour and the inner ends 131 of the said pistons and a co-relative contour, the same being also true of the outer ends of the pistons and the wall of the cylinder within which they move so that in all positions of the pistons a proper fitting thereof in the cylinder will be maintained.

The slight clearance between the pistons and the cylinder walls, advantages of which have been mentioned, may be maintained in the present construction by providing the pistons with circular shoulder portions 132 entering corresponding depressions 133 in the periphery of the rotor and thereby maintaining the pistons properly centered and true in the cylinder so that none of the surfaces of the pistons themselves may come into actual contact with the cylinder walls or with the periphery of the rotor.

Special illustration or description of the oiling or cooling arrangements in connection with this example have not been entered into herein as being considered unnecessary in view of the earlier disclosure in Figures 1 to 14, the said Figures 15 to 17 being more or less diagrammatic and simply for the purpose of indicating the possibility of modification of the previous construction.

The invention also lends itself without extensive modification to operation by constant pressure such as of steam, compressed air or preignited gas, as in the example shown in Figures 18 to 21 wherein the rotor members 10 and 11 carry the pistons 36 and 37 which are controlled by the gear 23 in the manner already described in connection with Figures 1 to 14, 134 being the cylinder casings corresponding to the casings 2, and 135 the internal drums within the cylinder casings. The said cylinder casings differ in this example from the casings 2 in that they each have two exhaust ports 136 and two pairs of inlet ports 137 and 138, the exhaust ports being arranged at the wider portions of the cylinders and the inlet ports at the restricted portions of the cylinders as shown in Figure 20.

139 is a steam pipe or main (which however may be a compressed air pipe or may be charged with pre-exploded or other gas or fluid under pressure) and is equipped with a two-way valve 140 which is adapted according to its adjustment to admit steam to pipes 141 or to pipes 142 leading to the inlets 137 or 138 respectively. Thus if the valve be adjusted in the position shown in Figure 21, steam will be admitted to the cylinders of the engine through the ports 137 and will move the pistons in a clockwise direction, viewing Figure 20, the steam being exhausted from between adjacent pistons as the leading piston in each case passes beyond the upper or lower exhaust port 136. Similarly, reversal of the valve will result in reversal of the engine due to the steam being admitted through the ports 138, as will be understood without further explanation.

Figure 22:
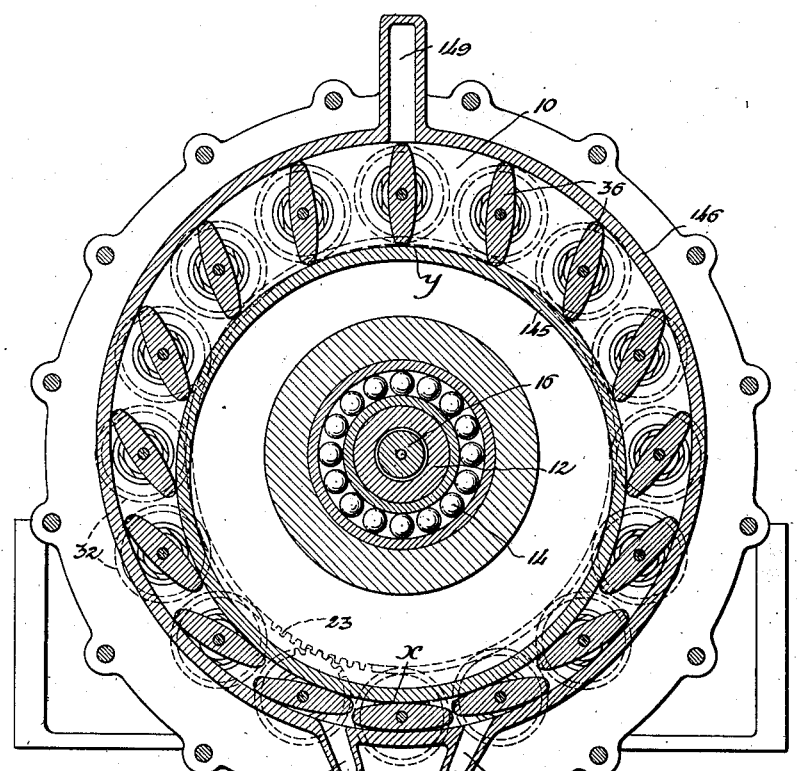
Figure 22 illustrates in section a still further modified form of the invention as adapted to operate by constant pressure such as steam.

Another method of employing the principle of flat blade-like pistons operating in an annular cylinder of variable cross section is illustrated in Figure 22, wherein it will be seen that the cylinder has inner and outer walls 145 and 146 respectively of approximately circular form with their inner and outer surfaces generated envelopes of the path of the pistons, whereby the cylinder is restricted at $x$ and is widest at $y$, and in this case the pistons 36 mounted on the rotor member 10 are arranged to perform half a revolution during each revolution of the rotor so that with the cylinder arranged with its restricted portion lowermost as in the figure, the blades are horizontal as they pass through such restricted portion, and vertical as they pass though the wider portion of the cylinder.

In this case I show inlets 147 and 148 for the admission of fluid under pressure to the cylinder, the said inlets being arranged on either side of the restricted portion of the said cylinder, so that operation of the engine may be effected in either direction according to which of the inlets is utilized, and 149 is an exhaust port at the wider portion of the cylinder.

From the foregoing descriptions of other arrangements of the invention, the operation of this arrangement will be quite obvious without further detailed explanation, but it is pointed out that in this arrangement the semi-rotation of the pistons on each revolution of the rotor causes the blades to alternately expose their opposite sides to the pressure of the operating fluid, each time they are exposed thereto.

Thus the pistons may rotate counter to or in the same direction as the rotor or they may be radially disposed on the rotor and rotate in one or other direction as may be deemed necessary or convenient, and still further, it will be understood that the number of revolutions of the piston relevant to the revolutions of the rotor may be either greater or less than that of the rotor according to requirements as to the number of cycles of operation required in each revolution of the rotor, so that in the four cycle internal combustion engine the pistons may revolve once to each revolution of the rotor, and in a two cycle engine they may perform one revolution to two revolutions of the rotor. Similarly, if eight cycles are required, the pistons may perform two revolutions to one of the rotor, and so on.

Figure 23:
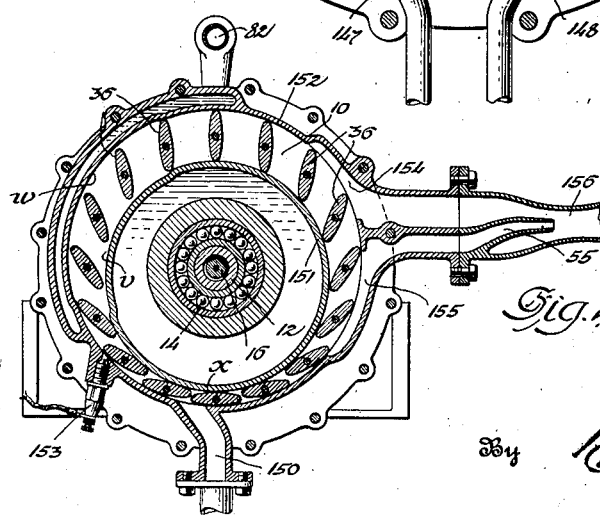
Figure 23 is a similar view, on a smaller scale, of a modified application of the piston arrangement of Figure 22 for operation as an internal combustion engine.

Figure 23 illustrates an adaptation of such a piston arrangement to an internal combustion engine, and in this case it will be seen that it admits of operation on the two cycle principle wherein an explosive mixture under compression is admitted through the inlet 150 to the restricted portion $x$ of the cylinder, the inner and outer walls 151 and 152 of which are of generally circular form but may be provided with clearances $v$ and $w$ in the firing portion of the cylinder analagous to the clearances $g$ and $h$ shown in Figure 7 and for the same purpose.

153 is a spark plug for effecting initial ignition of the charge in starting the engine which may then continue to operate by the back firing of the ignited gases in the firing portion of the cylinder to the gases behind each piston as it enters such firing portion as already described in connection with the said Figure 7.

The exhaust portion of the cylinder is provided with exhausts ports 154 and 155 similar to the ports 52 and 54 of the arrangement shown in Figure 7 and opening in a similar manner into a Venturi tube 156, thereby securing the scavenging of products of combustion from between the pistons before they again receive a new charge from the inlet 150, which scavenging has been one of the principal difficulties met with in a two cycle engine, so that this problem is very effectively solved by this arrangement.

It will be obvious that the same advantages such as absence of reciprocating motion, freedom from necessity of lubricating the pistons in the cylinders, continuous torque, reduction of mechanical friction, tangential application of force, compactness, and so forth, may be attained in this construction as in other constructions described, and detailed description of this modification is therefore not further entered into.

The embodiment of my invention in an engine design admits of very simple construction, all of the moving parts being rotary and easily balanced about their centers of rotation and about the axis of the rotor, the machine work required being of such simple and straight forward nature that it may readily be effected on a production basis, and, furthermore, the device is capable of easy and quick assembling without the same care and attention which is usually required in reciprocating engines to obtain smooth running relationship of the movable elements. Still further, the lack of inlet and exhaust valves which is possible in an engine of the type described results in a great reduction of the number of parts and mechanisms ordinarily called for where such valves are present both in the valves themselves and the means for the operation and timing of the valves, and the disadvantages attendant upon the use of valves and valve mechanisms such as are well known to those conversant with this art are likewise overcome.

The flexibility of an engine of this type is marked due to the large number of impulses per revolution of the rotor, which as already explained amounts to practically even and continuous application of power to the rotor, and this even application of power results in a minimum of vibration together with a minimizing of impact loads on the bearings, so that smoothness of operation and ability of the engine to withstand wear for a great length of time is secured. The lack of complicated valve mechanisms, crank shafts and other parts, such as distributor mechanisms which may be omitted in an engine embodying this invention, and the eliminating of the necessity of building heavy structures to withstand impact loads such as are present in reciprocating engines, permits of a very light construction of the invention relative to its horse power. A high degree of efficiency may be secured as the power is supplied in practically a continuous manner to a rotating body in the direction of its rotation and a very great variation of running speed is possible within the range of efficient operation of the engine.

Although the pistons have been referred to as being of generally elliptic form in cross section, it is to be understood that they are not necessarily strictly so and may vary very considerably from such configuration and merely have their surfaces continuously curved in one direction, the pistons being out of round in cross section so that they are of a flattened nature.

Although the invention is described herein as embodied in an engine as such, it is pointed out that it readily lends itself to embodiment in rotary pumps either vacuum or pressure pumps by mechanically driving the rotor and reversing the inlet and exhaust ports to suit the circumstances of operation. Also the invention lends itself to use in hydraulic transmissions wherein power is transmitted from one member to another through the agency of fluid trapped between the pistons in the cylinder as in the case where the device is operated as a pump.

Herein and in the claims it is desired that the term "cylinder" be understood to indicate an annular chamber having a configuration generally conforming to the generated path of the pistons, and the term "generally elliptic" as applied to the pistons is intended to indicate a blade-like structure having curved surfaces adapted to co-act with the walls of the cylinder to maintain contact or practical contact with such walls during the annular variation of the blade-like pistons to the walls of the cylinder.

It has heretofore been explained that the described arrangements admit of the pistons being maintained slightly out of contact with the walls of the cylinder but it is not essential that they should be so out of contact as an actual sliding or rolling contact may be maintained if desired.

The precise number and shape of the pistons will, of course, be governed by requirements of operation and mechanical expediency and the invention may be developed within the scope of the following claims without departing from the essential features of the said invention, wherefore it is desired that the specification and drawings be read as merely illustrative and not in a limiting sense, except as necessitated by the prior art.

What I claim is:—

1. In a rotary machine, an annular cylinder, opposite walls of which alternately recede from and approach one another, a rotor, a plurality of pistons arranged in circular series on said rotor, said pistons being in the form of blades rotatable relative to said rotor, and means rotating said blades in said rotor as said rotor rotates whereby said blades pass edgewise between the closely approaching walls of the cylinder and progressively assume a transverse position with their edges disposed to the walls of the cylinder as they pass between the receded walls whereby said blades form a series of partitions in said cylinder, the volumetric spacing of which increases as the walls of the cylinder recede from one another, intake and exhaust means for said cylinder, said pistons being spaced to form a plurality of closed successive compartments of varying volume between said intake means and said exhaust means.

2. In a rotary machine, an annular cylinder, a rotor, a plurality of pistons arranged in circular series on and rotatable in said rotor, means controlling the rotation of said blades as they move with said rotor whereby they are progressively rotated from positions in which adjacent blades present their edges to one another to positions in which they present their faces to one another, opposite walls of the cylinder alternately receding from and approaching one another to agree with the varying angles of the blades to the said walls of the cylinder, intake and exhaust means for said cylinder, said pistons being spaced to form a plurality of closed successive compartments of varying volume between said intake means and said exhaust means.

3. In a rotary engine, an annular cylinder having inlet and exhaust ports, said cylinder narrowing at said inlet port and at a point opposite thereto, firing means at said point, said cylinder widening between said means and said exhaust port in the direction of rotation, a plurality of pistons arranged in circular series in said cylinder, said pistons being in the form of blades disposed in said cylinder at angles varying from that in which the edges of the blades are transverse to closely approaching walls of the cylinder at the inlet port to that in which the faces of the blades are transverse to such walls at the wider portion of the cylinder, and means controlling such variation of the angle of the blades as they travel around said annular cylinder.

4. In a rotary machine, an annular cylinder, a rotor, a plurality of pistons arranged in circular series on said rotor, said pistons being in the form of blades partitioning said cylinder, and means maintaining the faces of said pistons in planes parallel to a plane tangent to their orbit of movement in said cylinder, the walls of said cylinder alternately diverging and converging to agree with the consequent increasing and decreasing of the width of the path through which the said pistons travel, intake and exhaust means for said cylinder, said pistons being spaced to form a plurality of closed successive compartments of varying volume between said intake means and said exhaust means.

5. In a rotary engine, an annular cylinder, a plurality of pistons arranged in circular series in said cylinder and each having a generally elliptic cross section, a rotor on which said pistons are mounted, and means rotating said pistons relative to said cylinder as they are guided around said cylinder by said rotor whereby the minor axes of said pistons are successively disposed transversely of the cylinder at one point in their path, and the major axes transversely of the cylinder at another point in their path, the walls of said cylinder alternately widening and converging to accommodate the minor and major axes of the pistons at such points whereby the volumetric space between the pistons is increased or decreased as they approach the widened or restricted parts relatively of the cylinder, said cylinder having inlet and exhaust ports arranged proximate to restricted and widened parts respectively of said cylinder, firing means at the narrower portion which is adjacent to said wider portion in the direction of rotation, and exhaust means between said firing means and inlet port and beyond said firing means in the direction of rotation.

6. In a rotary machine, an annular cylinder opposite walls of which alternately recede from and approach one another, a plurality of pistons arranged in a circular series therein, each having a generally elliptic cross section, a rotor guiding said pistons around said cylinder, and means determining the disposition of the major axes of said pistons in the cylinder as they travel therein in such manner that the angle of such major axes to the tangents of the orbits of the pistons in the cylinder will vary and the pistons thereby accommodate themselves to the progressively narrowing or progressively widening nature of the cylinder, intake and exhaust means for said cylinder, said pistons being spaced to form a plurality of closed successive compartments of varying volume between said intake means and said exhaust means.

7. In a rotary machine, an annular cylinder having walls alternately receding from and approaching each other, a plurality of pistons of generally elliptic cross section arranged in circular series in said cylinder, a rotor on which said pistons are rotatable on their axes and which guides said pistons in a circular path around said cylinder, and means rotating said pistons on their own axes to cause them to vary in angular position to the converging or diverging walls of the cylinder, whereby the major axes of the said pistons progressively vary from a tangential to a radial relation to the orbit of movement of the said pistons as said pistons travel from the most restricted to the widest portion respectively of the cylinder, and vice versa, intake and exhaust means for said cylinder, said pistons being spaced to form a plurality of closed successive compartments of varying volume between said intake means and said exhaust means.

8. In a rotary machine, a rotor, a plurality of pistons arranged in circular series on said rotor and rotatable on their own axes in said rotor, said pistons having a generally elliptic cross section, means controlling the rotation of said pistons on their axes upon the rotation of said rotor in such manner that they will move from an alignment of the major axes of adjacent pistons wherein they closely approach one another to an alignment of the minor axes of adjacent pistons wherein the volumetric spacing of such pistons is much greater, and an annular cylinder having walls alternately converging and diverging to conform with the relative disposition of the said pistons, intake and exhaust means for said cylinder, said pistons being spaced to form a plurality of closed successive compartments of varying volume between said intake means and said exhaust means.

9. In a rotary engine, an annular cylinder having opposed walls alternately diverging and approaching one another whereby the cross sectional area of the cylinder progressively increases and decreases, a plurality of pistons arranged in circular series in said cylinder and partitioning the cylinder into chambers, progressively increasing or decreasing in capacity according to the increasing or decreasing cross sectional area of the cylinder, a rotor guiding said pistons around said cylinder, said pistons being approximately elliptic in cross section whereby their minor axes may pass through the restricted portions of the cylinder, and the major axes span the wider portion of the cylinder, means controlling the disposition of such axes of the piston as they move around the cylinder, so that they will pass through the restricted and widened portions of the cylinder in such manner, intake means at one of the wider portions of said cylinder, firing means at the narrower portion which is adjacent to said wider portion in the direction of rotation, and exhaust means between said firing means and intake means and beyond said firing means in the direction of rotation.

10. In a rotary machine having an annular cylinder, a rotor, a plurality of pistons in the form of blades arranged in circular series partitioning said cylinder, the cross sectional area of said cylinder varying throughout its length and providing an exhaust portion of decreasing capacity, exhaust means opening in succession from the exhaust portion of said cylinder the second of said means opening into the first and being subject to the induction of exhaust gases escaping through the first exhaust means, said pistons being spaced to form a plurality of closed successive compartments of varying volume between said intake means and said exhaust means.

11. In a rotary machine, an annular cylinder, a rotor, a plurality of pistons arranged in circular series on and rotatable in said rotor, means controlling the rotation of said blades as they move with said rotor whereby they are progressively rotated from positions in which adjacent blades present their edges to one another to positions in which they present their faces to one another, opposite walls of the cylinder alternately receding from and approaching one another to agree with the varying angles of the blades to the said walls of the cylinder, said pistons being maintained by said rotor out of contact with the walls of said cylinder to an extent sufficient to avoid friction between the pistons and such cylinder walls, intake and exhaust means for said cylinder, said pistons being spaced to form a plurality of closed successive compartments of varying volume between said intake means and said exhaust means.

12. In a rotary machine according to claim 11, means maintaining the faces of the pistons opposed to the rotor out of contact with the rotor for the purpose of avoiding friction between such faces and the rotor.

13. In a rotary engine having an annular cylinder, a rotor, pistons in the form of blades arranged in circular series in said cylinder and rotatably mounted in said rotor, the walls of said cylinder varying to conform alternately with the thickness or width of said blades as they rotate during their travel around said cylinder, pinions through which said pistons are rotated, a gear controlling the rotation of said pinions, and gearing controlling the rotation of said gear relative to said rotor, intake and exhaust means for said cylinder, said pistons being spaced to form a plurality of closed successive compartments of varying volume between said intake means and said exhaust means.

14. A rotary machine according to claim 13, a hollow shaft in said rotor, an inner shaft extending through said hollow shaft, said gear being mounted within said rotor and on said inner shaft and said gearing effecting a geared connection between said hollow and said inner shaft.

15. In a rotary machine, a rotor, a plurality of pistons on said rotor in the form of blades, means controlling the motion of said pistons on said rotor whereby they progressively rotate from positions in which adjacent blades present their edges to one another to positions in which they present their faces to one another as they travel through their orbit of movement, a cylinder generally conforming to the envelop of the path of said blades, whereby opposite walls of said cylinder alternately diverge and converge, and means admitting a power producing fluid to said cylinder whereby the pistons are subjected to the pressure thereof as they move from an edge to edge relation to a face to face relation, said cylinder being provided with exhaust means for the escape of fluid from said pistons when in an edge to edge relation, said pistons being spaced to form a plurality of closed successive compartments of varying volume between said intake means and said exhaust means.

16. In a rotary machine, an annular cylinder, the outer and inner walls of which are of generally elliptic configuration with their major axes at right angles to one another, a rotor, a plurality of pistons on said rotor in the form of blades arranged in circular series in said cylinder, means controlling the movement of said blades as they travel around said cylinder, whereby the faces of said pistons are tangent to approaching walls of said cylinder at restricted portions thereof and transverse to said cylinder at wider portions thereof, said cylinder having inlet and exhaust ports at opposite sides of the restricted portions of said cylinder, and means controlling the admission of fluid through said inlet ports on one or other side of the said restricted portions whereby the operation of said pistons may be effected in one or other direction, said pistons being spaced to form a plurality of closed successive compartments of varying volume between said intake means and said exhaust means.

17. In a rotary internal combustion engine, an annular cylinder of unequal cross sectional area providing progressively widening inlet and firing portions interposed by progressive compression and exhaust portions, a plurality of pistons arranged in circular series in said cylinder, said pistons being in the form of blades movable around and partitioning said cylinder, a rotor on which said blades are mounted, and means controlling the angular disposition of the blades on said rotor whereby said blades pass edgewise through the narrower portions of said cylinder and with their faces transverse to the cylinder through the wider portions thereof resulting in increasing and decreasing volumetric space between the pistons as they move towards the wider or narrower portions respectively of the cylinder, said cylinder having exhaust and inlet ports in advance of and beyond one of the narrower portions of said cylinder, and firing means at the other of the narrower portions of said cylinder.

18. In a rotary internal combustion engine, an annular cylinder of unequal cross sectional area providing progressively widening inlet and firing portions interposed by progressively narrowing compression and exhaust portions, a plurality of pistons arranged in circular series partitioning said cylinder and movable around said cylinder, said pistons being of elliptic cross section and adapted to pass in the direction of their major axes through the narrower portions of said cylinder and in the direction of their minor axes through the wider portions thereof whereby the volumetric space between the pistons decreases and increases as they move towards said narrower and said wider portions respectively of said cylinder, a rotor on which said pistons are mounted, and means controlling the disposition of the pistons whereby their major and minor axes are related to the walls of the cylinder in the manner aforesaid.

19. In a rotary internal combustion engine having an annular cylinder, a rotor, a plurality of pistons arranged in circular series partitioning said cylinder, said cylinder including a firing portion merging into an exhaust portion, and means in the walls of said cylinder at the final end of said firing portion ensuring close fitting of said pistons in said cylinder as they complete their travel through the said firing portion of the cylinder.

20. In a rotary internal combustion engine having an annular cylinder including inlet, compression, firing and exhaust portions, a plurality of pistons arranged in circular series and movable in an orbit successively through the said portions of the cylinder, the walls of said cylinder closely approaching said pistons to form isolated compartments therebetween in the compression portion of the cylinder and substantially spaced from the pistons in the firing portion of the cylinder to provide a continuous firing chamber through which said pistons travel, and means in the wall of said cylinder closely approaching said pistons as they pass from said firing chamber whereby said pistons are then subjected successively to the pressure of ignited gases in the firing portion of the cylinder.

21. In a rotary internal combustion engine, an annular cylinder, the outer wall of which is of a generally elliptic configuration and the inner opposed wall of a generally elliptic configuration with its major axis at right angles to the major axis of the outer wall, a rotor, a plurality of pistons on said rotor in the form of blades arranged in circular series in said cylinder, means controlling the movement of said blades as they travel around said cylinder, whereby they rotate to accommodate themselves to variations in the spacing of the walls of the cylinder whereby the faces of said pistons are tangent to such walls at the restricted portions and transverse of the cylinder at the wider portions thereof, means for the introduction of an explosive charge about one of the restricted portions of the cylinder, exhaust means in advance of such restricted portion, and firing means at the opposite restricted portion of said cylinder.

In testimony whereof I affix my signature.

WALTER F. ROSS.